United States Patent
Slade

(10) Patent No.: US 7,364,509 B2
(45) Date of Patent: Apr. 29, 2008

(54) SYSTEMS AND METHODS FOR FACILITATING A WAGER

(75) Inventor: Richard Burnham Slade, Provo, UT (US)

(73) Assignee: Flagship Entertainment, Inc., Provo, UT (US)

( * ) Notice: Subject to any disclaimer, the term of this patent is extended or adjusted under 35 U.S.C. 154(b) by 225 days.

(21) Appl. No.: 10/852,613

(22) Filed: May 24, 2004

(65) Prior Publication Data

US 2005/0261043 A1    Nov. 24, 2005

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/40; 463/1; 463/9; 463/23; 463/41; 463/42; 463/43; 700/90; 700/91; 700/92

(58) Field of Classification Search ........... 463/23, 463/1, 9, 40–43; 700/91–93
See application file for complete search history.

(56) References Cited

U.S. PATENT DOCUMENTS

| | | | |
|---|---|---|---|
| 4,918,603 A | 4/1990 | Hughes et al. | |
| 5,018,736 A | 5/1991 | Pearson et al. | |
| 5,263,723 A | 11/1993 | Pearson et al. | |
| 5,280,426 A | 1/1994 | Edmonds | |
| 5,505,665 A | 4/1996 | Bumstead | |
| 5,575,474 A | 11/1996 | Rossides | |
| 5,695,400 A | 12/1997 | Fennell, Jr. et al. | |
| 5,749,785 A | 5/1998 | Rossides | |
| 5,830,069 A | 11/1998 | Soltesz et al. | |
| 5,846,132 A | 12/1998 | Junkin | |
| 5,860,862 A * | 1/1999 | Junkin | 463/40 |
| 5,971,854 A | 10/1999 | Pearson et al. | |
| 6,012,984 A | 1/2000 | Roseman | |
| 6,135,881 A | 10/2000 | Abbott et al. | |
| 6,203,433 B1 | 3/2001 | Kume | |
| 6,236,900 B1 | 5/2001 | Geiger | |
| 6,322,451 B1 * | 11/2001 | Miura | 463/42 |
| 6,371,855 B1 | 4/2002 | Gavriloff | |

(Continued)

OTHER PUBLICATIONS http://www.swirve.com/casino/prv/sports.html.

(Continued)

*Primary Examiner*—Robert Pezzuto
*Assistant Examiner*—Milap Shah
(74) *Attorney, Agent, or Firm*—The Webb Law Firm

(57) ABSTRACT

Methods and systems of facilitating a wager include, a computer implemented method of facilitating a wager between players. The method may include receiving an initial offer from an initial player and a challenging offer from a challenging player. The initial and challenging offers may include a fantasy team, and a wager amount. The method also may include calculating a score for the initial fantasy team and the challenging fantasy teams. The score may be determined based on the performance of fantasy team members of the initial fantasy team in at least one external event. Awarding a pay-off amount to the initiating player if the score for the initial fantasy team is higher than the score for the challenging fantasy team also may be a part of the method, where the pay-off amount is determined based on the total initial wager amount and the challenging wager amount.

20 Claims, 11 Drawing Sheets

U.S. PATENT DOCUMENTS

| | | |
|---|---|---|
| 6,406,371 B1 | 6/2002 | Baba et al. |
| 6,527,270 B2 | 3/2003 | Maksymec et al. |
| 6,669,565 B2 * | 12/2003 | Liegey ............... 463/42 |
| 6,910,965 B2 * | 6/2005 | Downes ............... 463/28 |
| 2002/0037767 A1 | 3/2002 | Ebin |
| 2002/0107073 A1 * | 8/2002 | Binney ............... 463/42 |
| 2002/0116319 A1 | 8/2002 | Black |
| 2003/0087701 A1 | 5/2003 | Paravia et al. |
| 2003/0096651 A1 | 5/2003 | Black |
| 2003/0154398 A1 | 8/2003 | Eaton et al. |
| 2004/0097287 A1 * | 5/2004 | Postrel ............... 463/41 |
| 2004/0266530 A1 * | 12/2004 | Bishop ............... 463/42 |
| 2005/0003878 A1 * | 1/2005 | Updike ............... 463/16 |
| 2005/0164792 A1 * | 7/2005 | Wilcock ............... 463/42 |

OTHER PUBLICATIONS http://www.bet-ex.com.
http://www.rotoplay.com/howtoplayfootballfo.asp.
http://www.worldwinner.com.
http://www.challenge.foxsports.com/basketball/03/weekly.
http://www.ssrg.com/ssrg$^2$.
http://games.espn.go.com/content/ffl/2003/story?id=1572774.
http://games.espn.go.com/gridweekly/frontpage.
http://www.fantasy5sports.com/football.
http://soccernet.fantasyleague.com/app/intro/howtoplay.asp.
http://www.head2head.com/football/rules.shtmlo.

* cited by examiner

900

CHALLENGE SECTION

↙ 902

| ORANGECRUSH | |
|---|---|
| 904 → $500 906 ↙ | |
| QB | BRET FARVE |
| RB | EMMIT SMITH |
| RB | CLINTON PORTIS |
| WR | RANDY MOSS |
| WR | JERRY RICE |
| TE | JEREMY SHOCKEY |
| K | JASON ELAM |
| DEF | MIAMI DOLPHINS |

908 → Click Here to Challenge

↙ 902

| MIDWAY MASHERS | |
|---|---|
| $250 | |
| QB | MICHAEL VICK |
| RB | CLINTON PORTIS |
| RB | MARSHAL FALK |
| WR | RANDY MOSS |
| WR | TERREL OWENS |
| TE | TONY GONZOLEZ |
| K | SEBASTIAN JANAKOWSKI |
| DEF | OAKLAND RAIDERS |

Click Here to Challenge

↙ 902

| SLICKVILLE | |
|---|---|
| $1,000 | |
| QB | JAKE PLUMMER |
| RB | CHARLIE GARNER |
| RB | EMMIT SMITH |
| WR | RANDY MOSS |
| WR | TIM BROWN |
| TE | DOUG JOLLEY |
| K | MARTIN GRAMMATICA |
| DEF | TAMPA BAY |

Click Here to Challenge

↙ 902

| THUNDERSTICK | |
|---|---|
| $750 | |
| QB | RICH GANNON |
| RB | RICKEY WILLIAMS |
| RB | DUCE STALEY |
| WR | ED MCCAFFERY |
| WR | DAVID BOSTON |
| TE | CHAD LEWIS |
| K | DAVID ACKERS |
| DEF | PHILADELPHIA EAGLES |

Click Here to Challenge

Fig. 4A

ORANGECRUSH ADMINISTRATION PAGE

OFFER TO PLAY

PURPLEREIGN DESIRES TO PLAY YOUR TEAM FOR $100.
HIS TEAM IS:

| | |
|---|---|
| QB | RICH GANNON |
| RB | RICKEY WILLIAMS |
| RB | CLINTON PORTIS |
| WR | DAVID BOSTON |
| WR | ISSAC BRUCE |
| TE | CHAD LEWIS |
| K | JASON ELAM |
| DEF | NEW ORLEANS SAINTS |

DOLLAR AMOUNT $100

ACCEPT

DECLINE

Fig. 4B

CREATE YOUR TEAM                    1100

| | |
|---|---|
| QB | |
| | 1102 |
| WR | |
| | |
| WR | |
| | |
| RB | |
| | |
| RB | |
| | |
| TE | |
| | |
| K | |
| | |
| DEF | 1104 |

ENTER DOLLAR AMOUNT [＿＿＿＿＿＿]

[ SUBMIT ]

Fig. 4C

SYSTEMS AND METHODS FOR FACILITATING A WAGER

BACKGROUND

The present invention relates generally to systems and techniques for wagering and, more particularly to systems and techniques for fantasy wagering.

Sports have provided considerable entertainment for generations. Many individuals each year attend sporting events, such as baseball games, football games, and auto races. Many other individuals watch the events on television or read about them in magazines or newspapers. Another common method of enjoying sporting events involves wagering on the events. Traditional methods of wagering on sporting events often involve a player selecting the individual or team who the player believes will win a particular game, auto race, or tournament. The player wins or loses an amount at stake based on the accuracy of his or her prediction.

The Internet, including the World Wide Web has brought another form of wagering, fantasy wagering, into the mainstream. Many sites on the Web and other networks provide fantasy wagering games. In fantasy wagering, a player selects a fantasy team made up of individuals or entities that compete in a real external event (e.g. game, etc.) or set of external events (e.g. tournament). For example, a fantasy baseball team may include a pitcher, a first baseman, etc., who actually compete in one or more professional baseball games. The members of the fantasy team need not be on the same real team. For example, the fantasy baseball team may include a pitcher from St. Louis and a first baseman from Chicago. The success or failure of a player's fantasy team is determined by the performance of its members in the external event or events.

Existing fantasy methods often are among a large number of players. Also, existing fantasy methods generally involve paying to participate in a player draft, consequently, a player does not view an opposing player's complete fantasy team before deciding whether to wager against the other player. Accordingly, enhanced systems and techniques for facilitating a wager are needed.

SUMMARY

In one general aspect, a wager may be facilitated by a computer-implemented method. The method may include receiving data representing an initial offer from an initial player. The initial offer may include an initial fantasy team and an initial total wager amount. The method also may include publishing the initial fantasy team and the initial total wager amount from a network location. Additionally, the method may include receiving second data representing a challenging offer from a challenging player. The challenging offer may include a challenging fantasy team and a challenging wager amount. The method also may include querying the initial player to accept or decline the challenging offer and calculating a score for the initial fantasy team. The score for the initial fantasy team may be determined based on the performance of the initial fantasy team in at least one external event. The method additionally may include calculating a score for the challenging fantasy team, and awarding a pay-off amount to the initial player if the score for the initial fantasy team is higher than the score for the challenging fantasy team. The pay-off amount may be determined based on the total initial wager amount and the challenging wager amount.

In another general aspect, a wager may be facilitated by a system. The system may include a team selection module for facilitating the selection of at least one fantasy team containing fantasy team members. The system also may include an initial offer module for receiving an initial offer from an initial player and publishing fantasy teams and wager amounts. The initial offer may include an initial fantasy team and an initial total wager amount. The system also may include a challenging offer module for receiving a challenging offer from a challenging player and querying the initial player to accept the challenging offer. The challenging offer may include a challenging fantasy team and a challenging wager amount. Additionally, the system may include a wager resolution module for calculating and comparing scores of at least two fantasy teams. The scores may be determined based on the performance of the fantasy teams in at least one external event. The wager resolution module also may be for determining a pay-off amount awarded to the initial player and the challenging player based on the initial total wager amount, the challenging wager amount, and the score of the initial fantasy team and the challenging fantasy team. The system also may include a fantasy team member database for storing the names of potential fantasy team members.

DESCRIPTION OF THE DRAWINGS

FIGS. 4A-4C illustrate exemplary graphical user interfaces according to one embodiment of the present invention.

DETAILED DESCRIPTION

In one general aspect, the present invention is directed to systems and methods for facilitating a wager. For simplicity, the basic components of such methods and systems are provided. However, as would be understood by one of ordinary skill in the art, the methods and systems described below may include various other structures and/or processes in actual implementation consistent with aspects of the present invention.

Figure 1:
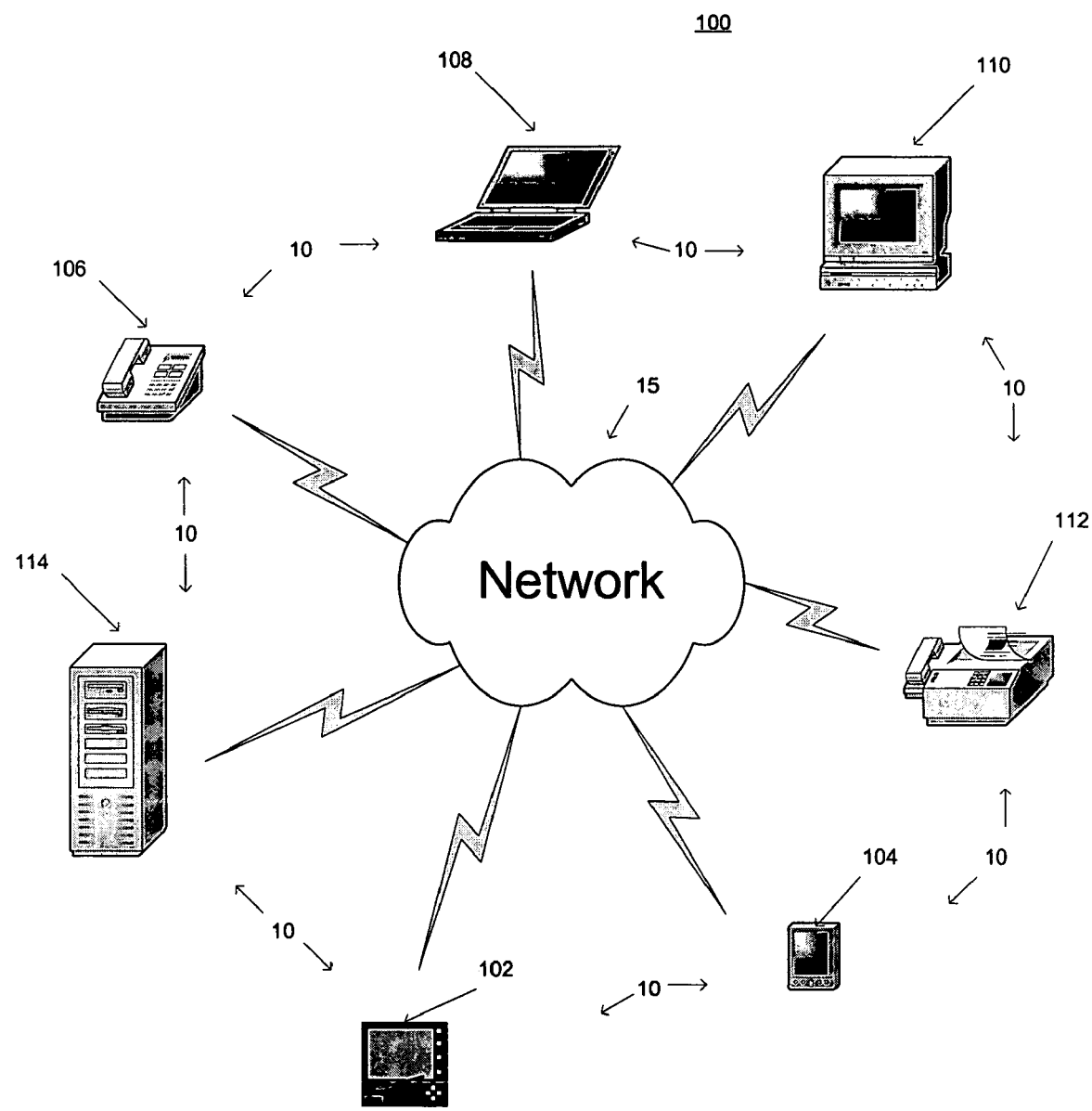
FIGS. 1 and 2 illustrate a communications system for facilitating a wager according to one embodiment of the present invention.

FIG. 1 illustrates an exemplary communications system 100. For brevity, several elements in the figure are represented as single entities. As shown, the communications system 100 may include several clients 10 interconnected through a network 15. In one implementation, the clients 10 include a personal computer (PC) 108, a workstation 110, and a server 114. In various implementations, the clients 10 also may be any other type of device having a digital processor capable of accessing the network 15, including a landline telephone 106, a facsimile (fax) machine 112, and wireless devices 102, 104. Examples of wireless devices include, but are not limited to, an Internet-enabled personal digital assistant (PDA), an Internet-enabled mobile telephone, and an interactive pager.

In general, the clients 10 include hardware and/or software components for communicating with the network 15 through wired and/or wireless communication pathways. The clients 10 may be structured and arranged to communicate using various communication protocols (e.g., HTTP, WAP, Bluetooth, etc.) to establish connections between network elements and/or to operate within or in concert with one or more other systems (e.g., the Internet and/or the World Wide Web).

The clients 10 may include one or more software applications and/or computer programs for commanding and directing communications. The software applications and/or computer programs may be embodied permanently or temporarily in any type of machine, component, physical or virtual equipment, storage medium, or propagated signal capable of providing instructions to the wireless device. In particular, the software applications and/or computer programs may be stored on a storage media or device (e.g., EEPROM, magnetic diskette, or propagated signal) readable by a computer system, such that if the storage media or device is read by the computer system, the functions described herein are performed.

The network 15 is configured to enable communication between and among the clients 10. For example, the network 15 may enable the server 114 to send and/or receive messages from the wireless devices 102, 104, the PC 108, and/or other any other client 10. The network 15 may directly or indirectly connect the clients 10 and may include and/or form part of an information delivery network such as, for example, an analog or digital wireless telecommunications network, the Internet, and/or the Web. The information delivery network may include a local area network (LAN), a wide area network (WAN), a telephone network, a radio network, a television network, a cable network, a satellite network, and/or any other communications network configured to carry data. Each network may include one or more elements such as, for example, intermediate nodes, proxy servers, routers, switches, adapters, and wired or wireless data pathways, configured to direct and/or deliver data.

In general, the network 15 may support a variety of telecommunications and/or data services including Internet and/or Web services. Providing Internet and/or Web services may involve enabling access by computer systems running client programs to electronic documents stored in computer systems running server programs. For example, information on the Web typically is provided by Web servers, such as, for example, server 114, and is accessible by a client program such as a Web browser. Web browsers and other client programs may use a communications protocol such as Hypertext Transfer Protocol (HTTP) to request electronic documents from Web servers.

Information on the Internet and/or Web may be represented by specially formatted text files (e.g., Web pages) written in Hypertext Markup Language (HTML) or some other markup language, such as XML, HDML, and/or VRML. Each text file may be identified by a network address such as a Universal Resource Locator (URL). A typical Web page may include one or more hyperlinks referring to the network addresses of other Web pages.

Figure 2:
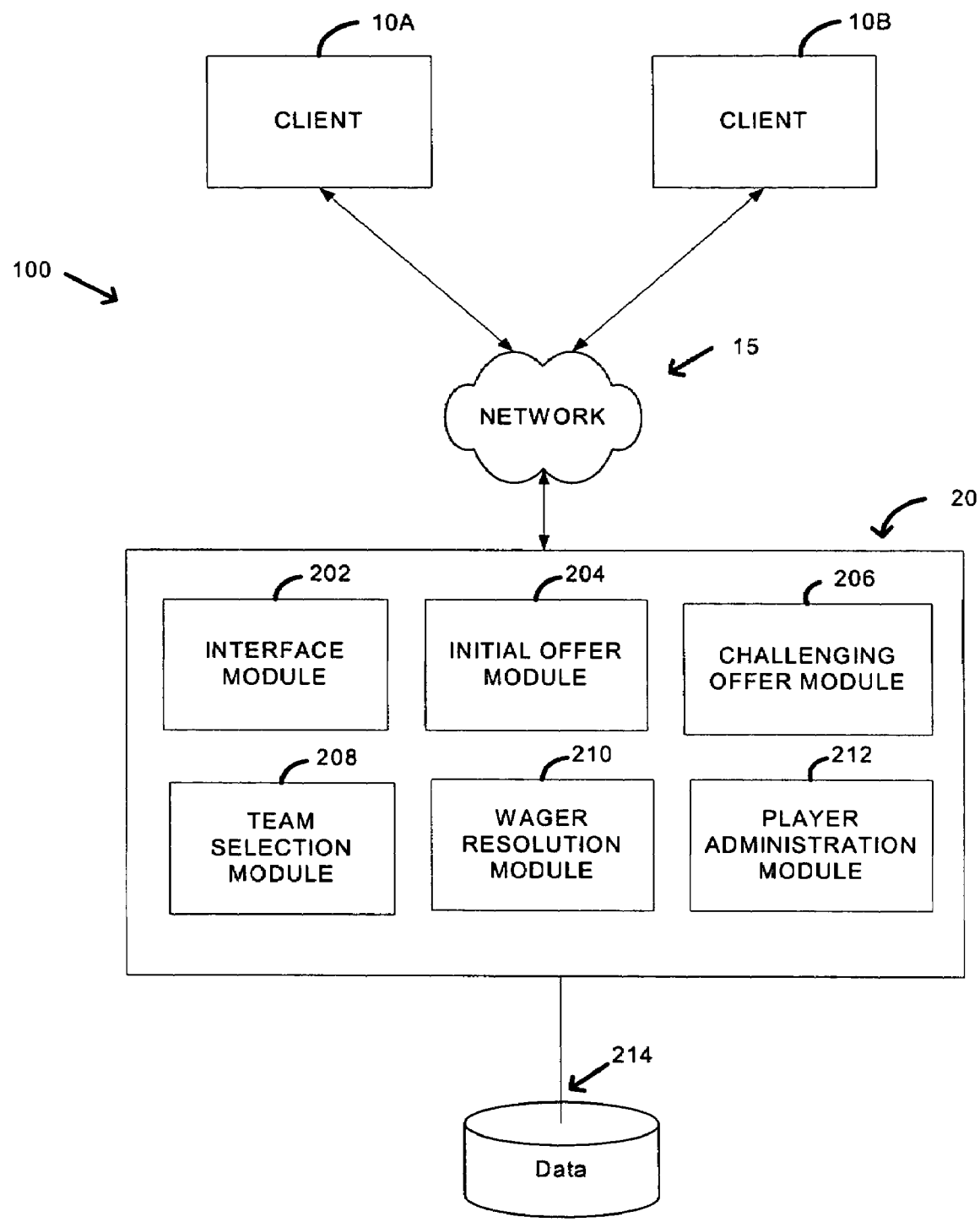

FIG. 2 shows an implementation of communications system 100 according to various embodiments, including a host system 20 for facilitating a wager. The modules 202-212 of the host system 20 may facilitate a wager by receiving initial offer data from an initial player, receiving challenging offer data from at least one challenging player, determining winning players, and awarding a pay-off amount. The data may be collected, and the reports communicated to users of the host system 20 through one or more access devices 10A, 10B through the network 15. The access devices 10A, 10B may be, for example, client devices of the communication system 100.

The host system 20 may be implemented as one or a number of centrally and/or remotely located networked computer devices (e.g. PC's, servers) and may include modules 202-212, as described below. The modules 202-212 may be implemented as software code to be executed by a processor (not shown) using any suitable computer language, such as, for example, Java, C, C++, or Perl using object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. A database 214 may be used to store data received or manipulated by the modules 202-212 of the host system 20.

According to various embodiments, the modules 202-212 of the host system 20 may present a user of the host system 20 with a set of user interfaces (UIs). One embodiment of a set of UIs that may be presented to a user of the communications system 100 according to aspects of the present invention is illustrated in FIGS. 4A-4C. In general, the UIs may be presented through an interactive computer screen to solicit information from and present information to a user in conjunction with a method for facilitating a wager. In one implementation, the UIs may be presented through access devices 10A, 10B, including personal computers running browser applications and having various input/output devices (e.g., keyboard, mouse, touch screen, etc.) for receiving user input.

Users of the host system 20, in various embodiments, may be initial players or challenging players relative to a wager. An initial player may use the host system 20 to post an initial offer to one or more other players. A challenging player may use the host system 20 to accept, in whole or in part, the offer of an initial player with a challenging offer. It will be appreciated that a player may be an initial player with respect to one wager and a challenging player with respect to another. In other various embodiments, the challenging offer may exceed the initial offer.

Figure 3A:
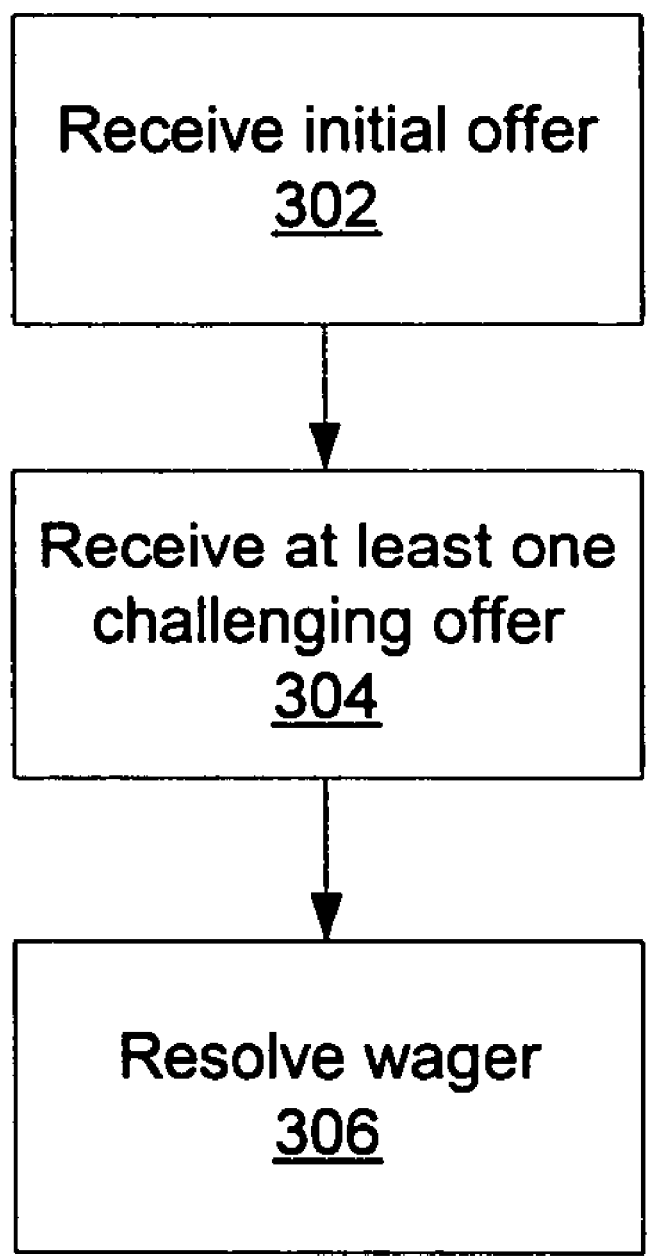
FIGS. 3A-3F illustrate methods for facilitating a wager according to one embodiment of the present invention.

FIG. 3A is a flowchart of one embodiment of a high-level process flow 300 for facilitating a wager according to various aspects of the present invention. While particular embodiments and examples are described and illustrated, the process 300 may be implemented by any suitable type of hardware (e.g., device, computer, computer system, equipment, component), software (e.g., program, application, instruction set, code), storage medium (e.g., disk, device, propagated signal), or combination thereof.

At step 302, an initial offer may be received. The initial offer may come from an initial player, and may include, for example, an initial fantasy team, and an amount that the initial player is willing to wager, or initial total wager amount. In one implementation, the initial total wager amount may be an amount of money, an amount of points, or an amount of any other thing to which the host system 20 may distribute rights.

At step 304, a challenging offer may be received from, for example, a challenging player. The challenging offer may include a challenging fantasy team and a challenging wager amount. Also at step 304, additional challenging offers may be received. In various embodiments, the sum of all of the challenging wager amounts may be less than or equal to the initial wager.

At step 306, the wager may be resolved by, for example, determining a winning player or winning players and distributing a pay-off amount. Additional features of systems and methods for facilitating a wager are described in the discussion below of the various modules 202-212 of the host system 20.

Figure 3B:
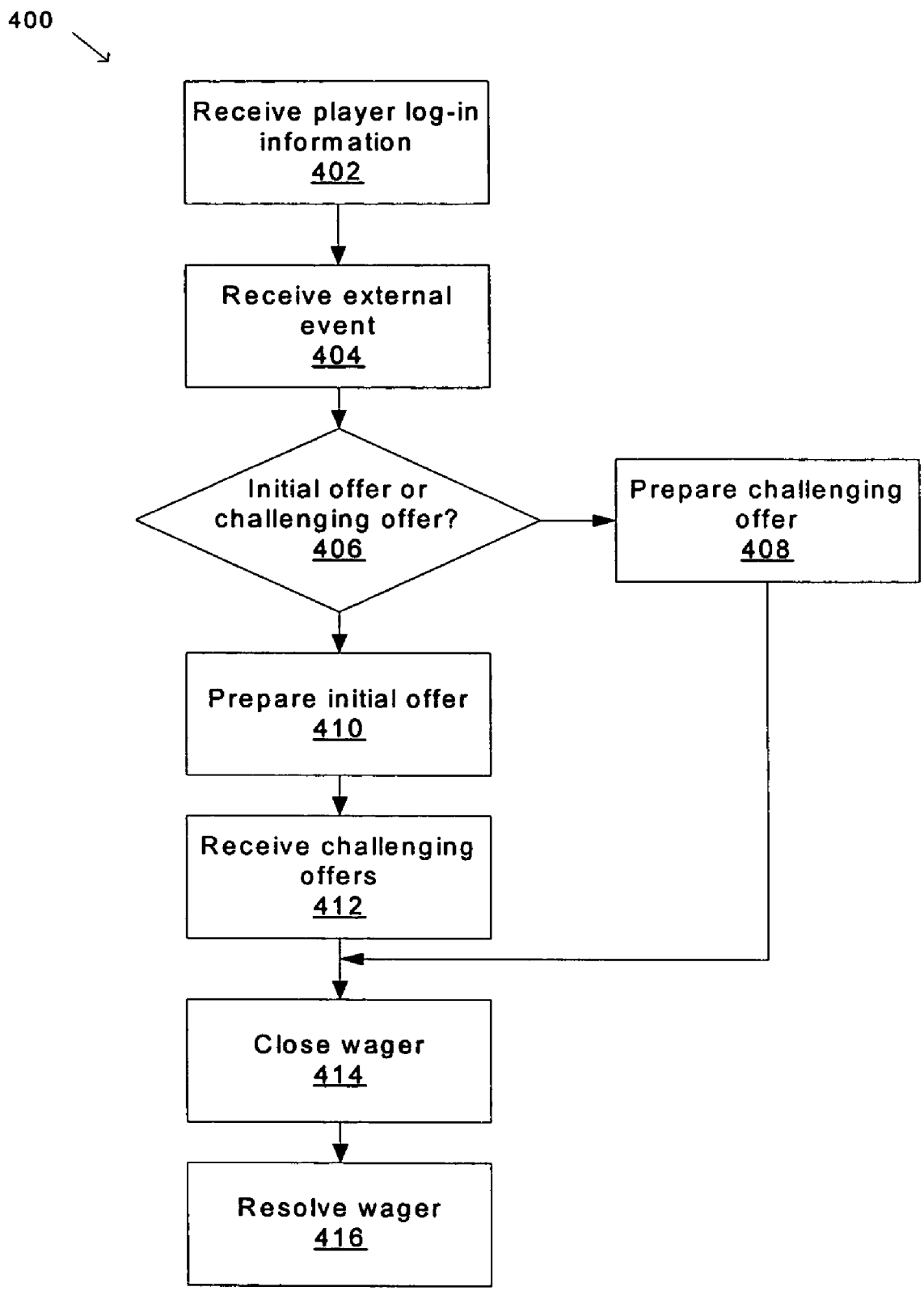

FIG. 3B is a flowchart of one embodiment of a process flow 400 through an interface module 202 according to various aspects of the present invention. While particular embodiments and examples are described and illustrated, the process 400 may be implemented by any suitable type of hardware (e.g., device, computer, computer system, equipment, component), software (e.g., program, application, instruction set, code), storage medium (e.g., disk, device, propagated signal), or combination thereof.

At step 402, the interface module 202 may receive log-in information from a player. According to various embodiments, the interface module 202 may proceed only if the player's log-in information indicates that the player is a registered user of the host system 20. The interface module 202 may receive a type or class of external event on which the player wishes to wager (step 404). For example, the player may indicate an intent to wager on baseball games, football games, auto races, etc. In one aspect, the interface module 202 also may receive an indication whether the player wants to make an off limits members wager or a handicapped members wager, as discussed in more detail below.

At step 406, the interface module 202 may prompt the player to indicate whether the player wishes to make a new initial offer or challenge an existing initial offer. If the player indicates an existing initial offer is to be challenged, the interface module 202 may prepare a challenging offer (step 408). If the player indicates that he or she would like to create a new initial offer, the interface module 202 may prepare an initial offer (step 410). Details of the preparation of initial and challenging offers according to various embodiments are described in more detail below, including the descriptions of the initial offer module 204 and the challenging offer module 206.

At step 412, the interface module 202 may receive one or more challenging offers. Challenging offers may have a challenging wager amount that is less than or equal to the difference between the initial total wager amount and the challenging wager amount of any other challenging offers that have already been accepted.

At step 414, the interface module 202 may close a wager. Closing a wager may involve preventing additional challenging offers from being made. For example, the interface module 202 may close a wager at the beginning of the one or more external events that form the basis of the wager, although different aspects may close a wager at different time, including before the external events and during the external events. Also, a wager may be closed when the challenging wager amount of accepted challenging offers is equal to, or nearly equal to the initial total wager amount, that is the amount available for wagering is at or near zero.

At step 416, the interface module may resolve the wager by determining winning players and distributing a pay-off amount. Additional details of wager resolution according to various embodiments are described in more detail below, including the description of the wager resolution module 210.

Figure 3C:
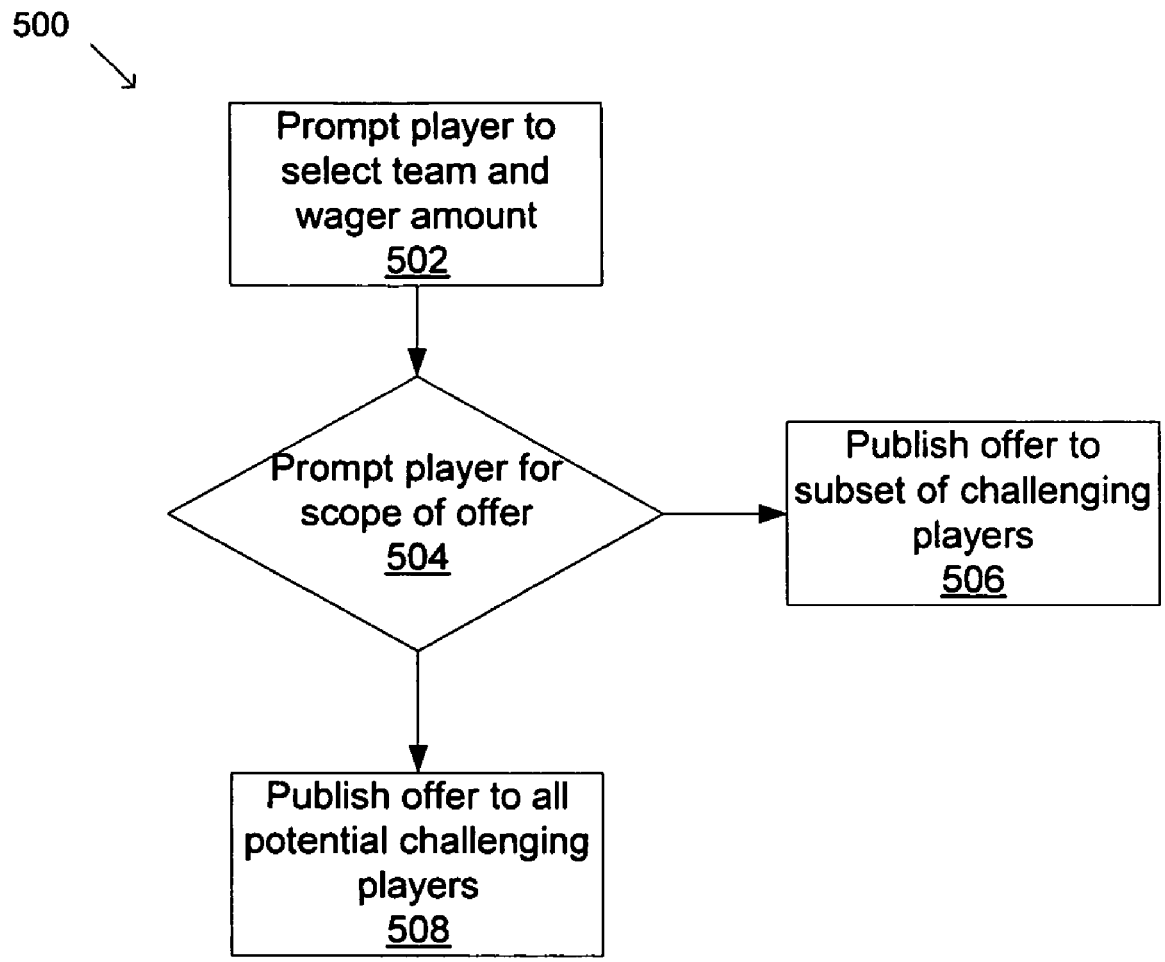

FIG. 3C is a flowchart of one embodiment of a process flow 500 through the initial offer module 204 according to various aspects of the present invention. While particular embodiments and examples are described and illustrated, the process 500 may be implemented by any suitable type of hardware (e.g., device, computer, computer system, equipment, component), software (e.g., program, application, instruction set, code), storage medium (e.g., disk, device, propagated signal), or combination thereof. In general, the process flow 500 relates to the way that the host system 20 prepares initial offers.

At step 502, the initial offer module 204 may prompt an initial player to select an initial fantasy team and an initial wager amount. Additional details of fantasy team and wager amount selection according to various embodiments are described in more detail below, including the description of the team selection module 208.

At step 504, the initial offer module 204 may prompt the player to indicate a scope of the offer, for example whether the initial offer should be published to all potential challenging players, or a subset of potential challenging players. If the player indicates that the initial offer should be published to all potential challenging players, the initial offer module 204 may publish the initial offer to all potential players (step 508). An initial offer may be published to all potential challenging players, for example, by including the initial offer in a challenge page, such as that illustrated by UI 900 shown in FIG. 4A, where the challenge page is available to all potential challenging players.

If the player indicates that the initial offer should be published to a subset of all potential challenging players, the initial offer module 204 may prompt the player for information identifying the subset and publish the initial offer to the subset of potential challenging players (step 506). The initial offer may be published to the subset of potential challenging players, for example, by including the initial offer in a challenge page, such as that illustrated by UI 900 shown in FIG. 4A, where the challenge page is available only to the subset, or by sending an e-mail or other electronic communication to other players, etc. In various embodiments, the initial offer may be published to the subset through the player administration module 212.

Figure 3D:
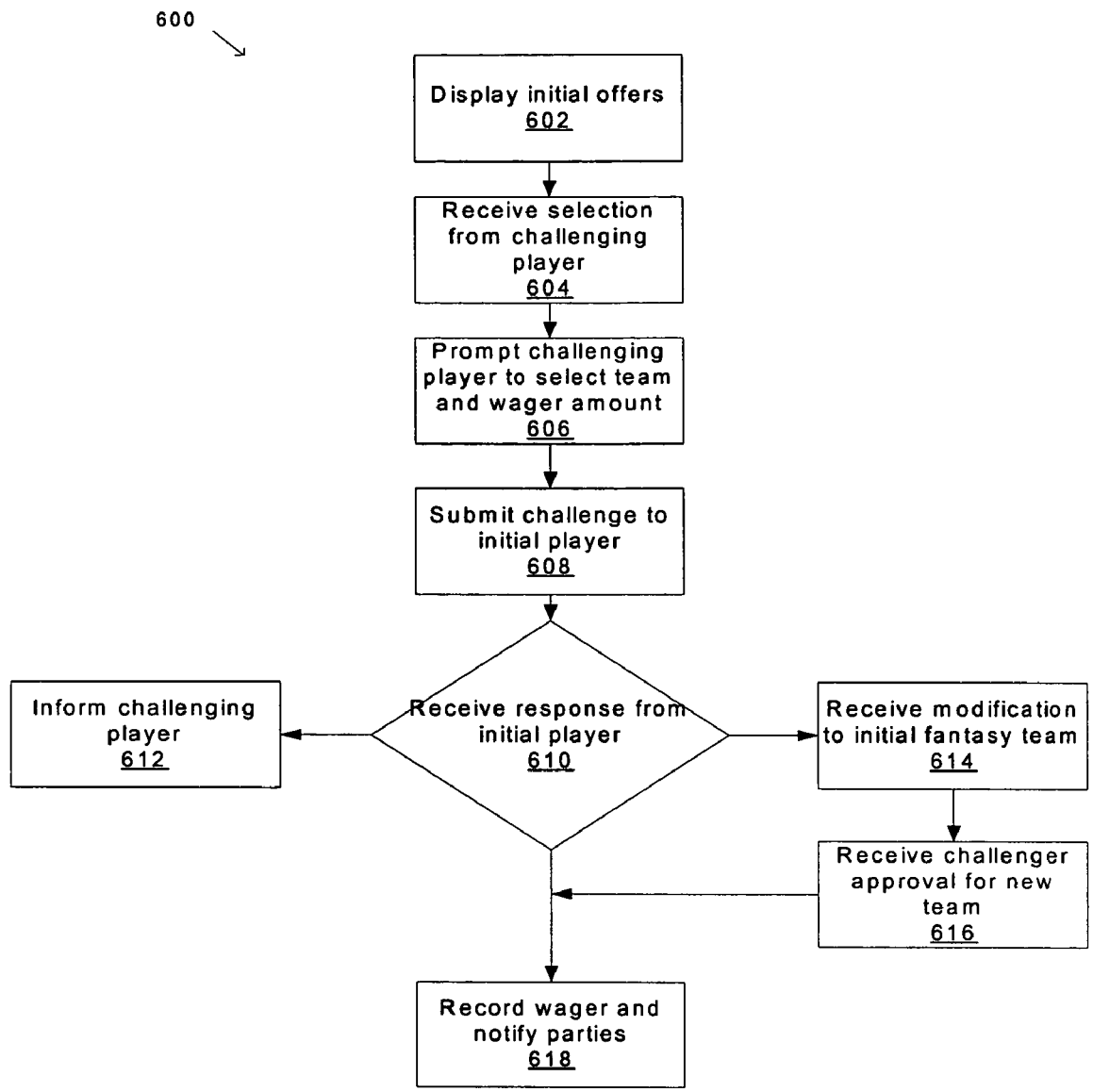

FIG. 3D is a flowchart of one embodiment of a process flow 600 through the challenging offer module 206 according to various aspects of the present invention. While particular embodiments and examples are described and illustrated, the process 600 may be implemented by any suitable type of hardware (e.g., device, computer, computer system, equipment, component), software (e.g., program, application, instruction set, code), storage medium (e.g., disk, device, propagated signal), or combination thereof. In general, the process flow 600 relates to the way that the host system 20 prepares challenging offers.

At step 602, the challenging offer module 206 may display available initial offers to the player. Available initial offers may be displayed on a challenge screen, such as UI 900 shown in FIG. 4A. Individual initial offers may be indicated by boxes 902. According to various embodiments, the challenging offer module may sort the available initial offers. For example, available initial offers may be sorted by external event and/or fantasy team members.

Each box 902 may contain information regarding the initial offer. For example, each box 902 may contain an amount available for wagering 904 and the composition of the initial fantasy team 906. The amount available for wagering 904 may indicate the initial wager amount selected by the initial player who created the initial offer. In various embodiments, if the initial offer has been partially accepted by a challenging offer with a challenging wager amount less than the initial total wager amount, the amount available for wagering 904 may indicate the initial wager amount minus the challenging wager amounts of one or more partial acceptances. The composition of the initial fantasy team 906 may indicate all of the members of the initial fantasy team as selected by the initial player. Although the boxes 902 show fantasy football teams, according to other various embodiments, fantasy teams may include participants in any external event.

At step 604, the challenging offer 206 module may receive from the challenging player an initial offer to be challenged. According to various embodiments, the challenging player may indicate an initial offer to be challenged by selecting the challenge button 908 from the box 902 of the desired initial offer.

At step 606, the challenging offer module 206 may prompt the challenging player to select a fantasy team and a challenging wager amount. Additional details of fantasy team and wager amount selection according to various embodiments are described in more detail below, including the description of the team selection module 208. According to various embodiments, the challenging wager amount may not be greater than the amount available for wagering.

The challenging offer module 206 may publish the challenging player's fantasy team and challenging wager amount to the initial player who created the initial offer for that initial player's approval (step 608). The publishing may take the form of an e-mail or other electronic communication, and may take place through the player administration module 212. In one embodiment, the publishing may include displaying the initial player UI 1000 shown in FIG. 4B. The initial player may be shown the challenging fantasy team and the amount of the challenging wager, as illustrated in UI 1000. The initial player also may be given an opportunity to accept or decline the challenging offer.

The challenging offer module 206 may receive a response from the initial player (step 610). If the initial player rejects the challenge, the challenging offer module 206 may inform the challenging player and end its operation (step 612). If the initial player accepts the challenge, the challenging offer module 206 may record the completed wager and notify the initial player and the challenging player that the wager has been completed (step 618).

In one aspect, the initial player may indicate to the challenging offer module 206 that acceptance of the challenging player's offer is conditioned on a modified initial fantasy team and/or a modified wager amount. In such cases, the challenging offer module 206 may prompt the initial player to enter changes to the initial fantasy team or wager amount (step 614). In various aspects of the present invention, changes made by the initial player may be applied only to the wager between the initial player and the challenging player, or may be applied to other wagers by the initial player based on the same initial offer. At step 616, the challenging offer module 206 may, in various embodiments, prompt the challenging player for approval of the new initial fantasy team and/or wager amount.

Figure 3E:
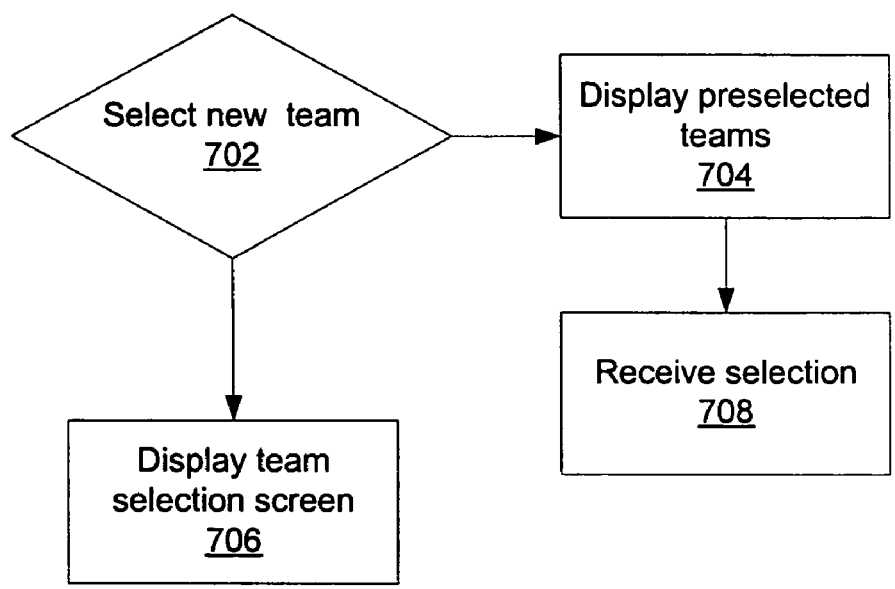

FIG. 3E is a flowchart of one embodiment of a process flow 700 through the team selection module 208 according to various aspects of the present invention. While particular embodiments and examples are described and illustrated, the process 700 may be implemented by any suitable type of hardware (e.g., device, computer, computer system, equipment, component), software (e.g., program, application, instruction set, code), storage medium (e.g., disk, device, propagated signal), or combination thereof.

In general, the process flow 700 relates to the way that the host system 20 prompts players for fantasy teams and wager amounts. At step 702, the team selection module 208 may prompt the player to indicate whether the player wishes to use a pre-selected fantasy team or select a new fantasy team. If the player elects to use a pre-selected fantasy team, the team selection module 208 may display a set of pre-selected teams to the player (step 704). At step 708, the team selection module 208 may receive from the player the pre-selected team to be used and a wager amount.

If the player elects to select a new fantasy team, the team selection module 208 may display a team selection screen and receive selections (step 706). For example, the team selection module 208 may display a UI 1100 shown in FIG. 4C. UI 1100 includes fields 1102 for selecting each member of a fantasy team. In one aspect, selecting a field 1102 may cause a list of potential fantasy team members to appear, from which a selection may be made. For example, clicking the field 1102 next to "QB" in UI 1100 may cause a list of available quarterbacks to be displayed. Potential fantasy team members may be stored in database 214. UI 1100 also may contain a field 1104 where a player may enter a wager amount. Although UI 1100 may be for the selection of a fantasy football team, other embodiments may include UIs for selecting fantasy teams including participants in any external event.

According to various embodiments, the players may select a wager with off-limits fantasy team members or a wager with handicapped fantasy team members. For example, initial offers soliciting a wager with off-limits fantasy team members may be displayed in an off-limits fantasy team members room. Similarly, initial offers soliciting a wager with handicapped fantasy team members may be displayed in a handicapped fantasy team members room.

In a wager with off-limits fantasy team members, the team selection module 208 may prevent one or more of the initial and challenging players from selecting certain off-limits fantasy team members. Off-limits members may be members who are particularly successful in their respective external events. For example, the top three quarterbacks in a football league may be designated as off-limits members. The database 214 may keep a record of which potential fantasy team members may be off limits.

In a wager with handicapped fantasy team members, the team selection module 208 may allow handicapped members to be selected, however, the wager resolution module 210 may deduct a set amount of points from any fantasy team containing a particular handicapped member. Different handicapped members may cause different penalties. For example, any fantasy auto racing team containing a driver who is leading the point standings may be penalized 4 points, and/or a fantasy auto racing team containing a driver who is second in the point standings may be penalized 2 points. The database 214 may keep a record of which potential fantasy team members may be handicapped. Additional details regarding the scoring of fantasy teams are described below, including in the description of the wager resolution module 210.

Figure 3F:
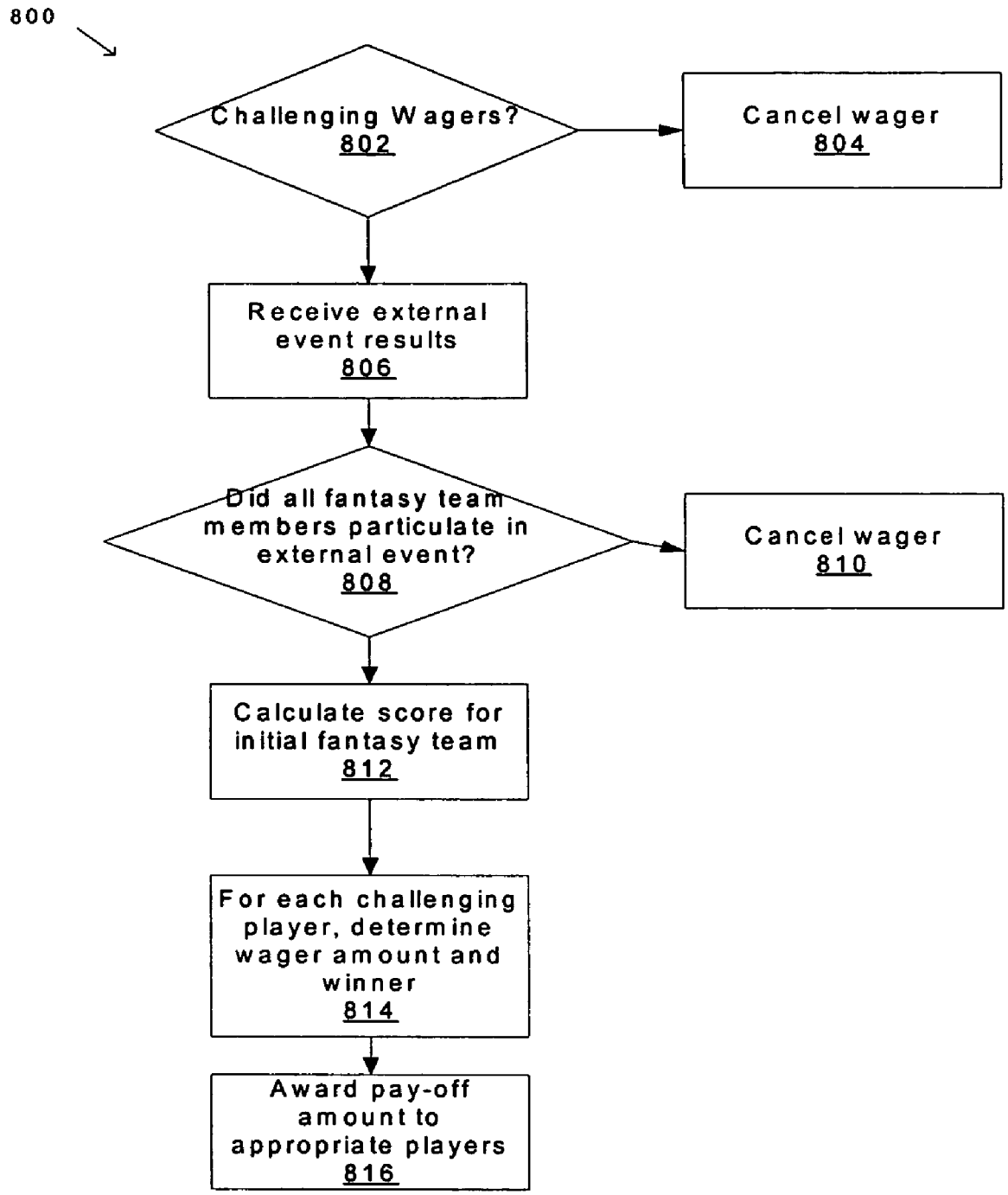

FIG. 3F is a flowchart of one embodiment of a process flow 800 through the wager resolution module 210 according to various aspects of the present invention. While particular embodiments and examples are described and illustrated, the process 800 may be implemented by any suitable type of hardware (e.g., device, computer, computer system, equipment, component), software (e.g., program, application, instruction set, code), storage medium (e.g., disk, device, propagated signal), or combination thereof. In general, the process flow 800 relates to the way that the host system 20 resolves wagers.

At step 802, the wager resolution module 210 may determine if the wager includes any accepted challenging offers. If the wager does not include any accepted challenging offers, the wager resolution module 210 may cancel the wager (step 804). If the wager does include one or more accepted challenging offers, the wager resolution module 210 may receive the results of the external event or events that are the basis of the wager (step 806). For example, if the external events include a football game or a set of football games, the wager resolution module 210 may receive the scores of the football game or games along with statistics of the performance of players in the game or games.

In one aspect, the host system 20 may determine whether all of the members of the fantasy teams involved in the wager actually participated in the external event or events. Fantasy teams involved in the wager may include, for example, the initial team and any challenging teams from accepted challenge offers. If one or more of the members of the fantasy teams involved in the wager did not take part in the external event or events, the wager resolution module 210 may cancel the wager (step 810). For example, the wager resolution module 210 may only cancel the portion of the wager involving a fantasy team including a member who did not participate in the external event or events. For example, if a member of a challenging fantasy team did not participate in the external event or event, the wager resolution module 210 may only cancel the portion of the wager involving that challenging team.

At step 812, the wager resolution module 210 may calculate a score for the involved fantasy teams. The score may be based on the performance of the members of the fantasy teams in the external event or events. For example, if the external events include a hockey game, fantasy teams may be awarded a set number of points for each save made by their goal keeper. In various embodiments, the method of awarding points may be made available to all players. Also, in various embodiments, there may be multiple methods of awarding points from which players may select one for a wager. Players also may be able to design their own system of awarding points.

At step 814, the wager resolution module 210 may determine a winning player and a pay-off amount for each accepted challenging offer that is a part of the wager. For each accepted challenging offer, the wager resolution module may compare the score of the challenging fantasy team to the score of the initial fantasy team. The team with a higher score may be the wining team of the wager. A pay-off amount may be awarded to the player with the winning team, who may be referred to as the winning player. The pay-off amount may be based on the challenging wager amount or another amount agreed upon by the players. For example, the pay-off amount may simply be the challenging wager amount, or in one aspect, may be the challenging wager amount multiplied by the difference in points between the team. In various embodiments, the pay-off amount may be capped by the wager resolution module 210.

According to various embodiments, the host system 20 also may contain a player administration module 212. The player administration 212 module may publish to a player the status of all the player's outstanding actions with the host system 20. For example, the player administration module 212 may publish all of the player's pending initial offers, and any accepted challenging offers. The player administration module 212 also may show the player the status of the player's other challenging offers made by the player. Additionally, the player administration module 212 may include a message section where the player may receive messages, such as, for example, a message communicating a pending challenging offer from another player.

A number of implementations have been described. Nevertheless, it will be understood that various modifications may be made and that other implementations are within the scope of the following claims.

I claim:
1. A computer implemented method of facilitating a wager between players, the method comprising:

receiving data representing an initial offer from an initial player, wherein the initial offer comprises an initial fantasy team and an initial total wager amount;

publishing the initial fantasy team and the initial total wager amount to a plurality of players;

receiving second data representing a challenging offer to the published initial offer from a challenging player, wherein the challenging offer comprises a challenging fantasy team and a challenging wager amount;

querying the initial player to accept or decline the challenging offer;

calculating a score for the initial fantasy team, wherein the score is determined based on the performance of the initial fantasy team in at least one external event;

calculating a score for the challenging fantasy team wherein the score for the challenging fantasy team is determined based on the performance of the challenging fantasy team in at least one external event; and awarding a pay-off amount to the initial player if the score for the initial fantasy team is higher than the score for the challenging fantasy team, and wherein the pay-off amount is determined based on at least one of the initial total wager amount and the challenging wager amount.

2. The method of claim 1, wherein the initial offer is accessible by one or more challenging players and one or more other players.

3. The method of claim 1, further comprising:
receiving third data from the initial player, the third data representing a revision of the initial fantasy team; and
publishing the revision of the initial fantasy team to the challenging player.

4. The method of claim 1, further comprising:
receiving third data representing an additional challenging offer from an additional challenging player, wherein the additional challenging offer comprises an additional challenging fantasy team and an additional challenging wager amount, and wherein the additional challenging wager amount is less than a difference between the initial total wager amount and the challenging wager amount; and
querying the initial player to accept or decline the additional challenging offer.

5. The method of claim 1, wherein the members of the initial fantasy team and the members of the challenging fantasy team are chosen from a list of potential fantasy team members stored in a database.

6. The method of claim 5, wherein a pre-selected set of potential fantasy team members may not be chosen for the initial fantasy team or the challenging fantasy team.

7. The method according to claim 5, wherein the initial player determines the amount of potential fantasy team members available for the wager.

8. The method of claim 1, wherein the score for the initial fantasy team is reduced by a pre-determined amount if the initial fantasy team contains one of a pre-selected set of potential fantasy team members.

9. The method of claim 1, further comprising receiving from the initial player a per point wager, wherein the pay-off amount is equal to the per point wager multiplied by the difference between the score of the initial fantasy team and the challenging fantasy team.

10. The method of claim 1, wherein the fantasy team members of the initial and challenging fantasy teams are selected from one of football players, baseball players, basketball players, hockey players, and auto racing drivers.

11. The method of claim 1, wherein the challenging fantasy team is chosen from a set of pre-selected fantasy teams.

12. A computer readable medium having stored thereon instructions which, when executed by a processor, cause the processor to perform the steps of:
- receiving data representing an initial offer from an initial player, wherein the initial offer comprises an initial fantasy team and an initial total wager amount;
- publishing the initial fantasy team and the initial total wager amount to a plurality of players;
- receiving second data representing a challenging offer to the published initial offer from a challenging player, wherein the challenging offer comprises a challenging fantasy team and a challenging wager amount;
- querying the initial player to accept or decline the challenging offer;
- calculating a score for the initial fantasy team, wherein the score is determined based on the performance of the initial fantasy team in at least one external event;
- calculating a score for the challenging fantasy team wherein the score for the challenging fantasy team is determined based on the performance of the challenging fantasy team in at least one external event; and
- awarding a pay-off amount to the initial player if the score for the initial fantasy team is higher than the score for the challenging fantasy team, and wherein the pay-off amount is determined based on at least one of the initial total wager amount and the challenging wager amount.

13. The method according to claim 12, wherein the initial player determines a list of potential fantasy team members from which at least the challenging fantasy team must be chosen.

14. A system for facilitating a wager between players, the system comprising:
- a team-selection module that facilitates the selection of at least one fantasy team containing fantasy team members;
- an initial offer module that receives first data representing an initial offer from an initial player and publishing fantasy teams and wager amounts to a plurality of players, wherein the initial offer comprises an initial fantasy team and an initial total wager amount;
- a challenging offer module that receives second data representing a challenging offer to the published initial offer from a challenging player and querying the initial player to accept the challenging offer, wherein the challenging offer comprises a challenging fantasy team and a challenging wager amount;
- a wager resolution module that calculates and comparing scores of at least two fantasy teams, wherein the scores are determined based on the performance of the fantasy team members of the initial and challenging fantasy teams in at least one external event, and for determining a pay-off amount awarded to one of the initial player and the challenging player based on at least one of the initial total wager amount, the challenging wager amount, and the score of the initial fantasy team and the challenging fantasy team; and
- a fantasy team member database that stores the names of fantasy team members.

15. The system of claim 14, wherein the challenging wager amount is equal to or less than the initial total wager amount.

16. The system of claim 14, wherein the challenging offer module is also for receiving third data representing an additional challenging offer from an additional challenging player, wherein the additional challenging offer comprises an additional challenging fantasy team and an additional challenging wager amount.

17. The system of claim 16, wherein the additional challenging wager amount is equal to or less than the difference between the initial total wager amount and the challenging wager amount.

18. The system of claim 14, wherein the wager resolution module terminates the wager if approval from the initial player of the challenging offer is not received.

19. The system of claim 14, wherein the challenging offer module is also for querying the initial player to modify the initial fantasy team.

20. The system of claim 14, wherein the initial offer module is further for receiving from the initial player a per point wager, and wherein the pay-off amount is equal to the per point wager multiplied by the difference between the score of the initial fantasy team and the challenging fantasy team.

* * * * *